United States Patent [19]

Brouwer

[11] 3,852,590
[45] Dec. 3, 1974

[54] COORDINATE CONTOUR TRACER

[75] Inventor: Frans Brouwer, Glencoe, Ill.

[73] Assignee: Stewart-Warner Corporation, Chicago, Ill.

[22] Filed: June 6, 1973

[21] Appl. No.: 367,633

[52] U.S. Cl. .............................. 250/202, 318/577
[51] Int. Cl. ........................................ G06k 11/02
[58] Field of Search...................... 250/202; 318/577

[56] References Cited
UNITED STATES PATENTS

| | | | |
|---|---|---|---|
| 3,135,904 | 6/1964 | Purkhiser | 250/202 X |
| 3,198,949 | 8/1965 | Holdo | 250/202 |
| 3,718,821 | 2/1973 | Vischulis | 250/202 |
| 3,767,923 | 10/1973 | Bardwell | 250/202 |

Primary Examiner—James W. Lawrence
Assistant Examiner—T. N. Grigsby

[57] ABSTRACT

The following specification describes a contour tracing photocell and circuit arrangement for a tracing head utilizing a plurality of equal area photocells in juxtaposed positions transverse to the axis of a line or pattern edge whose contour is being traced. In tracing a line or the edge of a pattern is projected intermediate the center pair of cells. A signal from each cell of the pair is combined with a signal from a respective cell spaced adjacent and on the opposite side of the other cell of the pair to provide a signal representing the direction and displacement of the line or edge. The signals are derived from respective tandemly connected differential amplifiers whose outputs are combined in a resistive summing circuit to derive signals representing direction and displacement of either a line, left pattern edge or right pattern edge for controlling both the steering head and coordinate drive motors to move the head along the line or edge.

6 Claims, 8 Drawing Figures

COORDINATE CONTOUR TRACER

BACKGROUND OF THE INVENTION

1. Field of the Invention

This invention relates in general to automatically operating contour tracing apparatus and more particularly to an improved photocell and circuit arrangement for controlling the tracing apparatus to follow the contour described by a line drawing or edge detail of a pattern.

2. Description of the Prior Art

Automatically operating tracing apparatus includes a scanning or tracing head carrying one or more photocells for sensing a drawing line or a pattern edge to in turn control a steering head motor and a pair of coordinate drive motors. The drive motors move the head along the line or edge together with one or more torches or tools operating on a workpiece to cut or form the workpiece contour represented by the line or edge. The steering motor maintains the photocells in a predetermined angular orientation relative the line or edge and controls the relative speed of the coordinate drive motors through a resolver to provide a resultant movement of the head and tool along the line or edge.

A recent innovation in tracing apparatus, such as shown in U.S. Pat. application Ser. No. 239,045, filed Mar. 29, 1972, is the use of a plurality of photocell pairs overlapping the line or edge to be traced for the purpose of deriving a signal from each cell dependent on the head orientation and displacement relative the line or edge. The signals are amplified and combined in different summing amplifiers dependent on whether a line or edge is being traced. This arrangement, while excellent, requires a preamplifier for each cell and, in addition, requires a summing amplifier for each combination of cells required to provide signals for the different functions of line and edge tracing, together with respective FET circuits.

SUMMARY OF THE INVENTION

In this invention the projection of the longitudinal line axis or pattern edge is normally located intermediate a pair of photocells, and a signal derived from each cell adjacent the line or edge is combined with a signal from a respective cell spaced from and on the opposite side of the line or edge and applied to a respective differential amplifier. The cells are all of substantially equal area and located in juxtaposed or adjacent positions along an axis transverse to the contour of the line or edge.

Each differential amplifier output signal is inverted by a tandemly connected respective differential amplifier or inverter. The signals from the four amplifiers are added in pairs in resistive adders comprising four pair of resistors. Thus, signals are derived representative of the presence of the contour and the relative displacement between the photocell and contour. The signals enable tracing of either a line or a left or right pattern edge.

To obtain low input impedance so that the photocell amplifiers operate as almost pure current amplifiers, a resistive feedback is employed between the amplifier output and its negative input.

For the purpose of balance and stability, it is necessary to provide low and equal input impedance for the photocell signals on each of the two differential inputs of the respective amplifiers. This is done by feeding the output signal of each inverter to the positive input of the preceding amplifier.

The described arrangement employs lamps operated by D.C. current for contour illumination. The configuration described reduces the number of amplifiers for signal amplification and combination. In addition, since a signal from a cell on each side of the line or edge is combined with a signal on the other side, the system is balanced and only the relative light difference between the two sides is necessary to sense a change in position. This eliminates the need for a large difference in light intensity between the contour and the background.

It is therefore an object of the present invention to provide an improved and more economical photocell circuit arrangement for use in tracing either a line or pattern edge.

BRIEF DESCRIPTION OF THE DRAWINGS

FIGS. 2, 2a and 2b are respective graphs illustrating the amplifier outputs for line, left edge and right edge tracing, respectively; and FIGS. 3, 3a and 3b illustrate typical photocell arrangements for use with the circuit apparatus shown in FIGS. 1 and 1a.

DESCRIPTION OF THE PREFERRED EMBODIMENT

Figure 1:
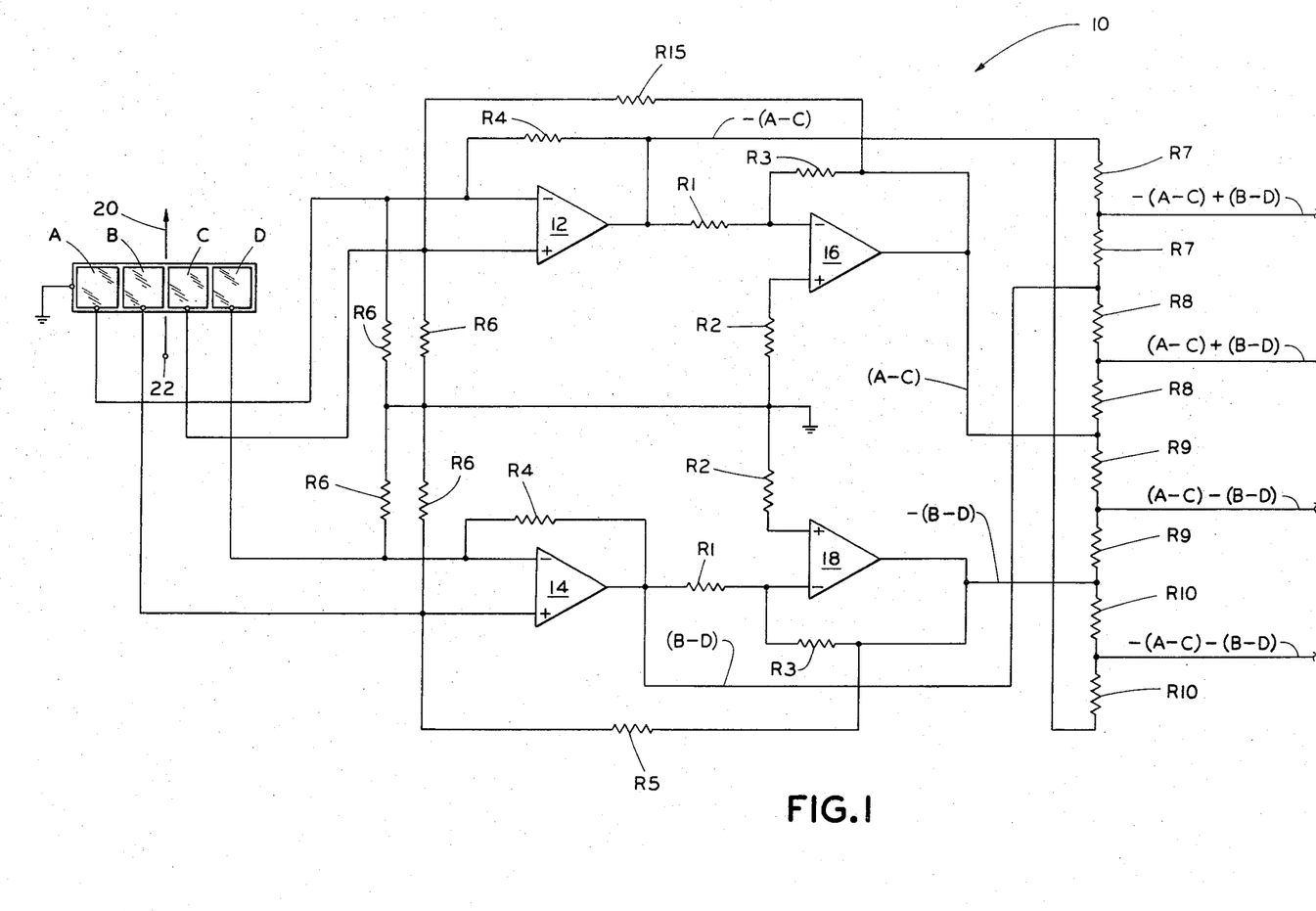
FIGS. 1 and 1a illustrate a photocell and circuit arrangement incorporating the principles of the present invention.
Figure 1A:
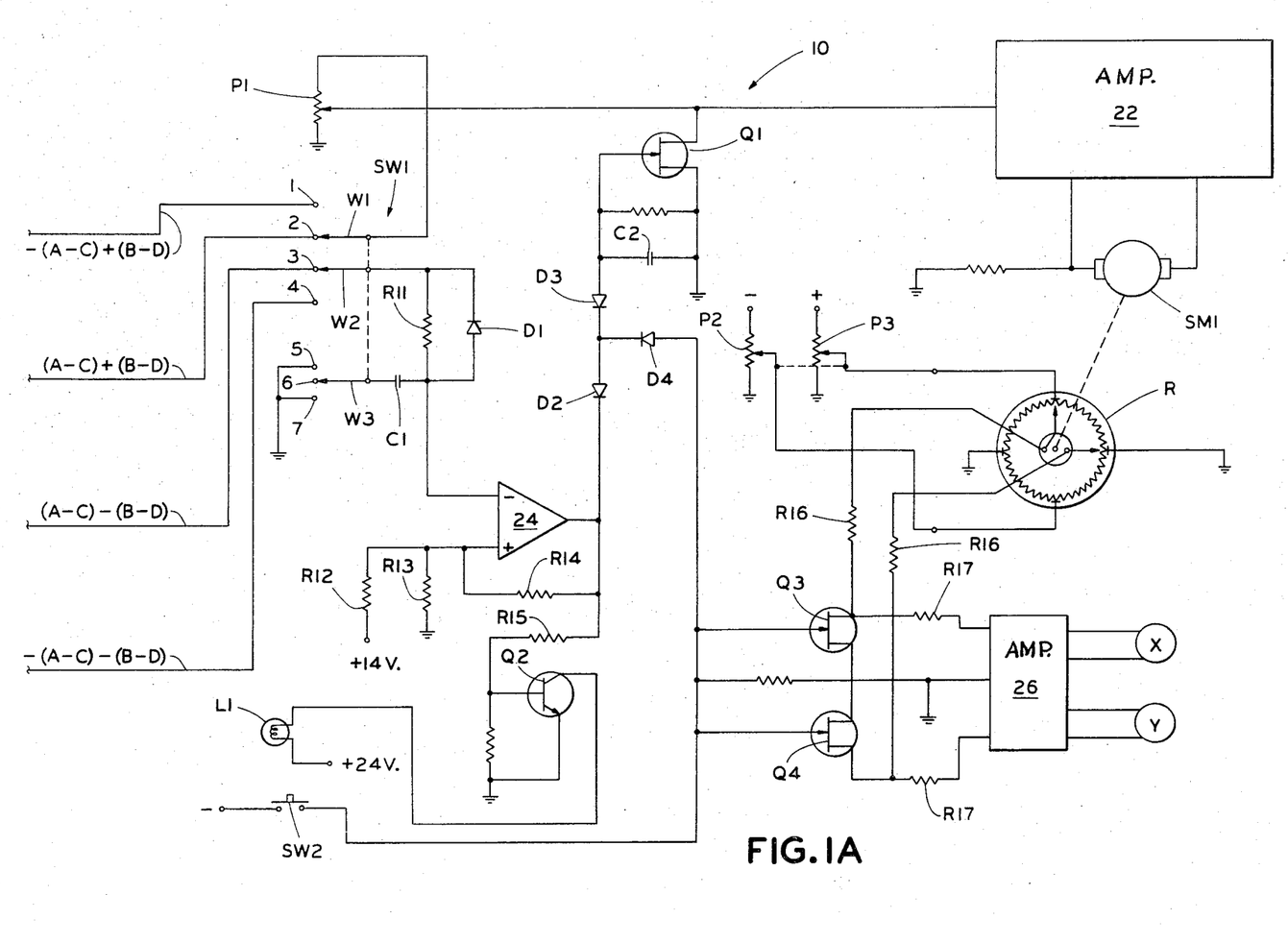

In FIGS. 1 and 1a a circuit incorporating the principles of the present invention is indicated by the reference character 10. The circuit 10 includes four juxtaposed approximately equal area photovoltaic type photocells A, B, C and D, respectively, adapted to generate positive going voltages on exposure to light. The cells A-D together with differential amplifiers 12, 14, 16 and 18 are carried by a scanning or tracing head (not shown) for movement in the direction of the arrow along an axis indicated at 20 in FIG. 1. The amplifiers 12, 14, 16 and 18 may be, for example, of the type MC 1537 or ME 1558 sold by Motorola, Inc. and disclosed in Linear Integrated Circuit Data Book, published December, 1972 by Motorola, Inc., copyright 1972. Irrelevant auxiliary external connections for the amplifiers, such as balancing networks, feedback stabilization networks and power connections, are not shown.

The axis 20 represents either the center of a line or a pattern edge which is to be traced. Two photocells A and B are arranged on one side of axis 20 during tracing and photocells C and D are located on the opposite side of axis 20 generally referred to hereinafter as the contour, so that the cells occupy adjacent positions along an axis transverse to axis 20. The described positions represent projections of the cells on the pattern by the optical system.

Power for the amplifiers and lamps (not shown) carried by the head, together with other connections, are furnished through slip rings (not shown) since the cells A, B, C and D and the lamps are rotatable by a steering head motor SM1 about an axis 22 from which the cells have an offset in a forward direction relative to the tracing motion, commonly referred to as forward offset. The lamps are supplied with D.C. power to light the surface beneath the photocells.

The head together with the associated cutting or forming apparatus are mounted on a carriage for conventional longitudinal movement. Carriage movement is provided by a pair of coordinate drive motors X and Y, which provide a resultant force for maintaining the head moving along contour 20 centered between cells B and C and the forming apparatus describes an identical contour displaced from contour 20. The relative speed at which the coordinate motors are operated is controlled by a resolver R, whose angular position is set in accordance with the angular position of a steering motor SM1 to provide an output signal for controlling the relative speeds of the coordinate motors X and Y. If the contour 20 represents a pattern edge, the pattern overlaps either cells A and B completely or cells C and D completely, or if the contour represents a drawing line, the drawing line overlaps substantially all of cells B and C to an extent dependent on the drawing line width.

Cells A and C are connected to the inverting and noninverting inputs, respectively, of the operational or differential amplifier 12. When the output of cell A alters as a result of a change in light intensity on cell A, the output of amplifier 12 is of opposite polarity to the input signal from cell A. When the output of cell C alters as a result of a change in light intensity on cell C, the output of amplifier 12 is of the same polarity as the output signal from cell C. The output of amplifier 12, therefore, represents the inverse of the difference in output of cells A and C as indicated by the character -(A-C) on the output lead of amplifier 12.

Cells B and D are connected to the non-inverting and inverting inputs, respectively, of the operational or differential amplifier 14. The response of amplifier 14 to a change in light intensity on cell B provides an output signal of the same polarity as the signal change of cell B, and a change in light intensity on cell D causes the output of amplifier 14 to reverse the polarity of the input signal of cell D. The output of amplifier 14, therefore, represents the output cell B less the output of cell D as indicated by the character (B-D) on the output lead of amplifier 14.

The outputs of differential amplifiers 12 and 14 are connected to the respective inverting or negative inputs of respective operational or differential amplifiers 16 and 18 through respective 10K resistors R1. The non-inverting or positive inputs of amplifiers 16 and 18 are connected to ground through respective 5K resistors R2 to ground. The output of amplifiers 16 and 18 are connected through 10K resistors R3 to their own inverting input.

The output of amplifier 16, therefore, represents the inverse of the output of amplifier 12 or the difference in output of cells A and C, as indicated by the character (A-C) on the output lead. The output of amplifier 18 represents the inverse of the output of amplifier 14 or the inverse of the difference in output of cells B and C, as indicated by the reference character -(B-D) on the output lead from amplifier 18.

The outputs of the differential amplifiers 12 and 14 are also each connected back to their own inverting inputs, respectively, through a respective 22 meg. resistor R4 to provide suitable amplifier gain and low input impedance for photocells A and D, respectively. Similar respective 22 meg. resistors R5 interconnect the output of amplifiers 16 and 18 back to the respective noninverting inputs of amplifiers 12 and 14, respectively, to provide low impedance to cells C and B, respectively. Thus, impedance matching for all cells is accomplished. Respective resistors R6 shunt the photocell inputs to amplifiers 12 and 14 for the purpose of minimizing amplifier drift.

The outputs of amplifiers 12, 14, 16 and 18 are combined in resistive adders using serially connected resistor pairs R7, R8, R9 and R10 with the resistors R7 being substantially 2.2K each, resistors R8 being substantially 5.6K each, resistors R9 being substantially 2.2K each and resistors R10 being substantially 5.6K each. Thus, lead -(A-C) is connected to one end of one resistor R7 and lead (B-D) is connected intermediate the other resistor R7 and one resistor R8 with the common terminal of resistors R7 connected to an output lead -(A-C) + (B-D) representing the sum of the outputs of amplifiers 12 and 14. Similarly, lead (A-C) is connected intermediate the other resistor R8 and one resistor R9 with the common terminal of resistors R8 connected to an output lead (A-C) + (B-D) representing the sum of the output of amplifiers 16 and 14. Lead -(B-D) is connected intermediate the other resistor R9 and one resistor R10 with the common terminal of resistors R9 connected to an output lead (A-C) − (B-D) representing the sum of the output of amplifiers 16 and 18. Lead -(A-C) is also connected to the other resistor R10 and the common terminal of resistor R10 is connected to an output lead -(A-C)−(B-D) representing the sum of the output of amplifiers 12 and 18.

The output lead -(A-C)+(B-D) is connected through a slip ring to terminal 1 of a switch SW1. The output lead (A-C)+(B-D) is similarly connected to terminal 2 of switch SW1. Lead (A-C)−(B-D) is connected to terminal 3 of switch SW1 and lead -(A-C)−(B-D) is connected to terminal 4 of switch SW1.

Switch SW1 is a manually operable gang switch having 3 poles or wipers W1, W2 and W3 to enable the operator to selectively connect leads -(A-C)+(B-D), (A-C)+(B-D) or (A-C)−(B-D) to the wiper W1 for either left edge, line or right edge tracing, respectively. Simultaneously, leads (A-C)+(B-D), (A-C)−(B-D) and -(A-C)−(B-D) are selectively connected to wiper W2 for either left edge, line or right edge tracing, respectively. When the top and center wipers of switch SW1 are connected for left edge tracing; i.e., connected to leads -(A-C)+(B-D) and (A-C)+(B-D) respectively, or for right edge tracing to leads (A-C)−(B-D) and -(A-C)−(B-D) respectively, the bottom wiper W3 is connected to ground at either switch terminals 5 or 7 to apply ground to one terminal of a time delay capacitor C1. The other terminal of capacitor C1 is connected to the center wiper W2 through a resistor R11 having a shunt diode D1 poled to allow discharge of capacitor C1.

Figure 2:
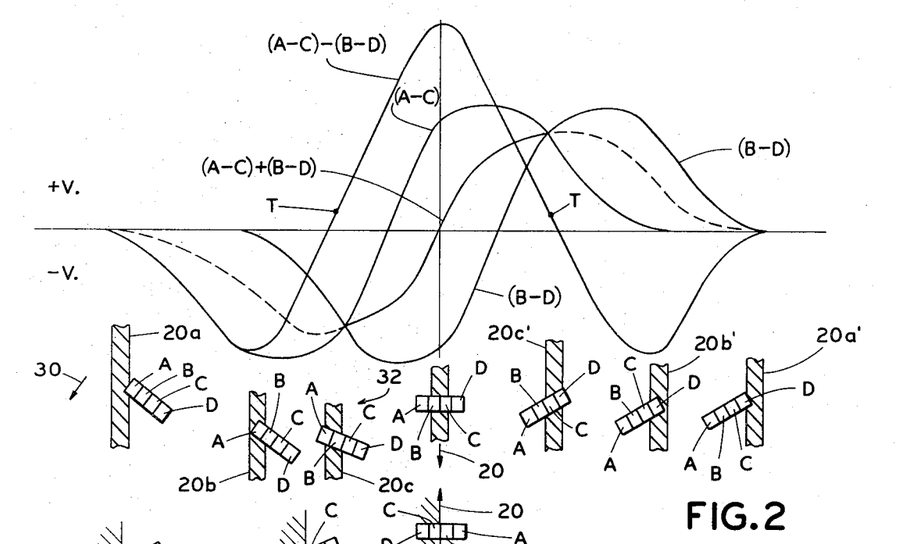
Figures 2A, 2B, 3, 3A, 3B:
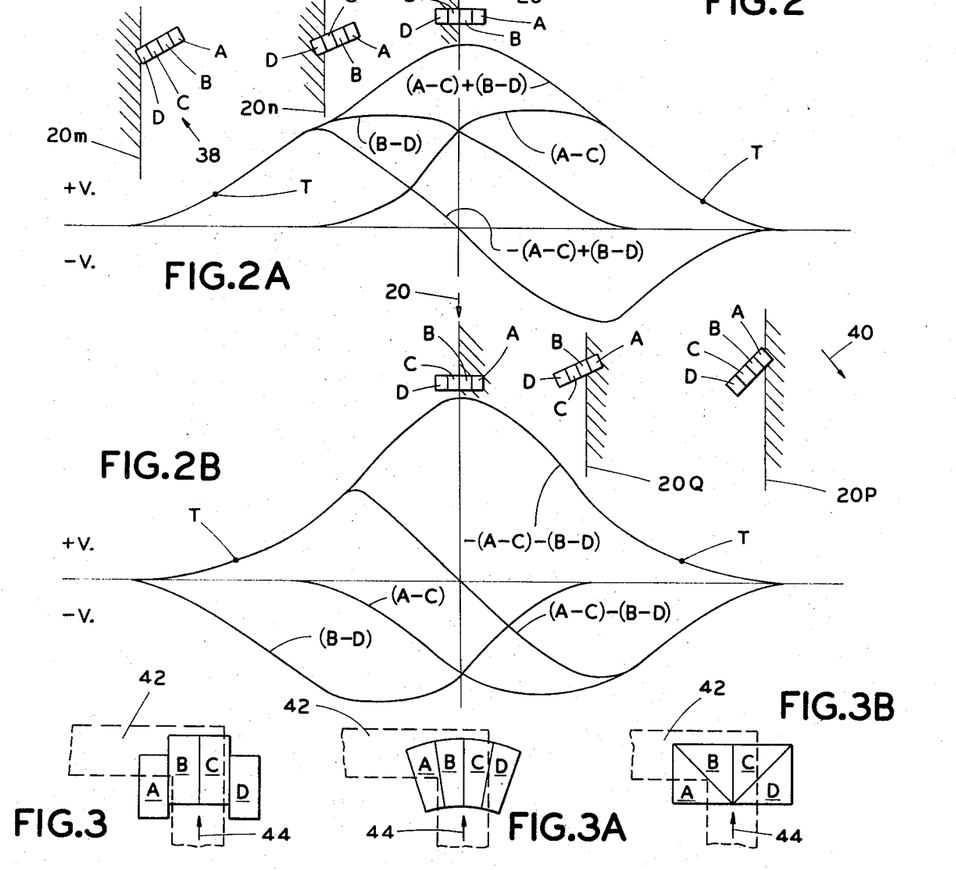

Briefly defined, left edge tracing occurs when cells C and D, as seen schematically in the center of FIG. 2a, overlap the pattern, while right edge tracing occurs when the cells A and B, as seen schematically in the center of FIG. 2b, overlap the pattern.

The signal on the top wiper W1 of switch SW1, representing displacement, provides steering sense commonly called a steering signal and is connected through a steering gain potentiometer P1 to the input of a steering servo amplifier indicated by box 22, whose output is coupled to the steering motor SM1. The output of a normally conductive field effect transistor Q1 is connected to the output of potentiometer P1 to hold the input to amplifier 22 at ground potential and prevent application of a signal on wiper W1 to the steering servo amplifier 22 until Q1 is rendered nonconductive.

The signal on the center wiper W2 of switch SW1 represents the presence or absence of the contour beneath the steering head, commonly called the off-pattern signal, and is connected to the inverting input of an operational or differential amplifier 24, similar to amplifiers 12–18 through resistor R11 and the diode D1 in shunt with R11. The non-inverting input of amplifier 24 is connected to a voltage divider at the junction of a high value resistor R12 and a low value resistor R13 to provide a low positive potential at the non-inverting terminal. This potential sets a low threshold voltage T at the inverting terminal of amplifier 24 which voltage must be exceeded by the off-pattern signal before the amplifier 22 is enabled. The junction of resistors R12 and R13 is also connected through a high value resistor R14 to the output of amplifier 14 to operate amplifier as a hysteresis switch. The output of amplifier 24 is normally positive and therefore offers a higher threshold voltage to the signal on wiper W2. When the threshold voltage is reached, indicating the head is over the pattern, the amplifier reverses its output and provides a high negative voltage, thereby reducing the threshold level. In order to revert to its original condition again, the signal on wiper W2 must fall below the lowest value of the threshold voltage T. This prevents erratic switching of the amplifier 24 in response to marginal signals over the threshold level. The positive output of amplifier 24 when the head is off the pattern is extended through resistor R15 to the base circuit of a transistor switch Q2 to render transistor Q2 conductive. A lamp L1 in the collector circuit of Q2 is therefore lighted when Q2 is conductive to signal that the head is off the line or pattern edge.

When the output of amplifier goes negative, representing the presence of a contour beneath the head, it turns Q2 off to extinguish lamp L1 and signal that the head is on or over the line or pattern edge. When the output of amplifier 24 goes negative, this output is also passed through serially connected diodes D3 and D4 to the base circuit of transistor Q1 for turning Q1 off, thus enabling amplifier to respond to the steering signal. A capacitor C2 connected between the base circuit of Q1 and ground provides a short delay before Q1 can become conductive to disable amplifier 22 and thereby avoid the effect of transient signals caused by pattern imperfections. Transistor Q1, on becoming nonconductive, removes ground from the input of amplifier 22 and permits a steering signal on wiper W1 to be applied through P1 and amplifier 22 to the steering motor SM1 for properly orienting the head relative the line or edge.

The junction of diodes D2 and D3 is also connected through a diode D4 poled to pass a negative output from amplifier 24 to the base circuits of normally conductive field effect transistors Q3 and Q4 to hold transistors Q3 and Q4 off.

When the base circuits of transistors Q3 and Q4 go negative, they become nonconductive. Transistors Q3 and Q4, when nonconductive, prevent ground from being applied to the respective junctions of respective serially connected resistors R16 and R17. Resistors R16 and R17 are connected between respective outputs of resolver R to the coordinate drive amplifiers indicated by box 26 for transmitting the resolver output signals to the coordinate drive motors X and Y for operating the X and Y motors at relative speeds corresponding to the angular orientation of the head. Ganged potentiometers P2 and Pe permit the operator to set the voltage on the resolver for operating the motors X and Y for driving the tracing head and the cutting or forming apparatus in the direction of the contour at a preset speed.

In addition, a manually operable catch line switch SW2 is provided to enable an operator to place a negative potential on the base circuits of transistors Q3 and Q4 as long as the switch SW2 is held operated. This negative potential prevents conduction by transistors Q3 and Q4 for permitting the resolver to transmit appropriate signals to the amplifiers indicated by box 26 for operating the X and Y motors.

If the head is to follow a line described by or corresponding to the contour or axis 20 in FIG. 1, switch SW1 is operated to connect the top wiper W1 to terminal 2 and the center wiper W2 to terminal 3, as seen in FIG. 1a. Wiper W1 connects lead (A-C)+(B-D) to potentiometer P1 and wiper W2 connects lead (A-C)−(B-C) to the inverting input terminal of amplifier 24. The head is manually rotated to orient the cells A–D at approximately 45°, for example, to the line. This rotation also angularly orients the resolver R at a corresponding angle. The operator also holds catch line switch SW2 operated to place a negative voltage on the base circuits of transistors Q3 and Q4 for preventing their conduction. This enables an input signal to be applied from resolver R over respective resistors R16 and R17 to the amplifiers indicated by box 26 and the X and Y motors. The speed for the X and Y motors is selected by the operator by setting the ganged potentiometers P2 and P3 at a control panel (not shown).

The motors X and Y operate to move the head carrying the cells A, B, C and D, shown schematically in FIG. 2, towards the line indicated at 20a in FIG. 2 in a direction such as indicated by arrow 30, for example. One or more lamps carried by the head provide light directed toward the background for reflection by the background through an appropriate optical arrangement which focuses the light on the cells.

The cells all sense substantially the same amount of background light before the cells are positioned over the dark contour representing the line 20a, to provide a positive voltage of the same level to all the inputs of amplifiers 12 and 14. The amplifiers 12, 14, 16 and 18, therefore, provide a zero output signal. The off-pattern lamp L1 in the collector circuit of transistor Q2 is lighted at this time to signal the operator that the head is off the line. Transistor Q1 conducts to place ground on the input to amplifier 22 for preventing a signal on wiper W1 and lead (A-C)+(B-D) from being applied to the steering motor SM1 at this time.

Assuming, for example, that the photocell A first senses the dark contour or drawing line indicated at 20a in FIG. 2, then the output of cell A decreases as the cell advances over the line. The positive signal from cell C, therefore, controls the high gain differential amplifier 12 to provide a positive going output. This output is applied to the inverting input of amplifier 16 and appears as an increasing negative signal on lead (A-C), seen by graph (A-C) in FIG. 2a. The signal on lead -(A-C) is simply the inverse of the signal on lead (A-C) and is not shown in FIG. 2 for convenience. Since the output from amplifiers 14 and 18 remains zero, the negative potential on lead (A-C) creates a negative going signal on leads (A-C)+(B-D) and (A-C)−(B-D), as seen by the graphs marked (A-C)+(B-D) and (A-C)−(B-D) in FIG. 2. The signal applied to amplifier 22 is actually held at ground at this time by conductive transistor Q1 and, therefore, the signal on lead (A-C)+(B-D) is not effective to control motor SM1 as shown by the dotted portion of graph (A-C)−(B-D).

The negative signal on lead (A-C)−(B-D) is below the threshold voltage T supplied from the junction of resistors R12 and R13, and not affecting amplifier 24, allows it to retain a positive output signal. Transistor Q1, therefore, continues to conduct to prevent control of motor SM1 by the signal on lead (A-C)+(B-D). Transistor Q2 is held conductive by the positive potential on its base to hold lamp L1 lighted and the negative potential on the base circuits of Q3 and Q4 from the switch SW2 holds those transistors nonconductive so that the coordinate motors X and Y continue to respond to the resolver orientation.

If the head approaches the line so that cell D first sensed the line instead of cell A, as indicated schematically by the line 20a' in FIG. 2, the output of cell D goes toward zero. The positive output of cell B controls amplifiers 14 and 18 to place a positive and negative output on leads (B-D) and -(B-D), respectively. The output on lead (B-D) goes increasingly positive, as shown by the graph B-D in FIG. 2, and lead -(B-D) goes increasingly negative as cell D advances over the line 20a'. The signal on lead -(B-D), whose graph is not shown, is simply the inverse of the signal on lead (B-D). With the output of cells A and C equal, amplifiers 12 and 16 provide no output so that a relatively positive signal appears on lead (A-C)+(B-D), again shown as a dotted line in FIG. 2, since Q1 is conducting at this time to hold lead (A-B)+(B-D) at ground. As just described, a relatively negative signal appears on lead -(B-D) to hold lead (A-C)−(B-D) negative as shown by graph (A-C)−(B-D) in FIG. 2, for no purpose as described when cell A first encountered the line.

It will be noted that lead (A-C)+(B-D) is provided for transmitting a signal to rotate the steering motor SM1. This signal normally rotates the head about axis 22 in the direction of the obscured cell. When the head is approaching the line, as described, this signal if applied to rotate the head toward the obscured cell A or cell D could result in alignment of the head perpendicularly to the line and obscuration of all cells A, B, C and D to thereby prevent normal functioning. The ground supplied by transistor Q1 at the input of amplifier 22 prevents this steering signal from being effective to rotate the motor SM1 at this time.

As the head continues to move across the line, as indicated at 20b in FIG. 2, cell B senses the line, assuming of course that the head is moving so that cell A first sensed the line. The positive output of cell B swings toward zero. Cell D, therefore, controls amplifiers 14 and 18 at the inverting inputs of each to provide negative and positive going signals on leads (B-D) and -(B-D), respectively. The output of amplifiers 12 and 16 remain positive and negative, respectively. With lead (B-D) going negative and lead (A-C) negative, as shown by respective graphs in FIG. 2, their sum drives lead (A-C)+(B-D) increasingly negative, as shown by the dotted portion in FIG. 2. With lead -(B-D) going positive and subtracted across resistors R9 from the negative potential on lead (A-C), the potential on lead (A-C)−(B-D) becomes less negative and swings toward zero as the cell B continues to move over line 20b, as seen in FIG. 2. Transistors Q1 and Q2 remain conductive and transistors Q3 and Q4 nonconductive, as previously explained.

If the head approaches the line, as indicated at 20b' in FIG. 2, with cell C being obscured after cell D, lead (A-C) starts to go positive; however, the output on lead -(B-D), which is the inverse of (B-D) shown in FIG. 2, is substantially negative, so that although lead (A-C)−(B-D) starts toward zero, it is still negative, as seen in FIG. 2, and transistors Q1 and Q2 remain conductive to prevent a signal on lead (A-C)+(B-D) from being applied to amplifier 22, while lamp L1 is held lighted.

Returning now to the situation where cells A and B are moved in sequence over the line, as cell B continues to move over the line 20c, its output continues to decrease and lead -(B-D) becomes more positive to move the signal on lead (A-C)−(B-D) in a positive direction to zero. The head thereafter moves cell C over the line while cell B is also over the line and cell A is partially uncovered as indicated by line 20c. The output of cell A goes positive while the output of cell C starts to decrease. The output of amplifier 16 to lead (A-C) accordingly moves in a less negative or in a positive direction. The output of amplifiers 14 and 18 on leads B-D and -(B-D) are negative and positive, respectively, as cell B is still obscured. With lead (A-C) going in a positive direction due to cell C going over the line indicated at 20c while lead -(B-D) is positive, lead (A-C)−(B-D) goes positive as soon as the difference between leads (A-C) and -(B-D) exceeds zero in a positive direction.

The positive signal on lead (A-C)−(B-D) is inverted by amplifier 24 as soon as the positive signal exceeds the threshold voltage T applied to the amplifier, to in turn apply a negative signal to the base circuit of transistor Q2 and through the diodes D2 and D3. The negative signal is applied to capacitor C2 and the base circuit of transistor Q1 and through diode D4 to the base circuits of transistors Q3 and Q4. Transistor Q1 is therefore cut off to remove ground from the input to amplifier 22 to permit the steering signal on lead (A-C)+(B-D) to be applied to amplifier 22 and the steering motor SM1, as shown by the solid portion of graph (A-C)+(B-D).

When the output of amplifier 24 switches negative, transistor Q2 is also driven to cut off and lamp L1 is extinguished. This signals the operator that the head is properly over the line so that he may release switch SW2. The negative output of amplifier 24, however, holds the base circuits of transistors Q3 and Q4 biased to cut off so that the release of switch SW2 does not affect the X and Y motors.

Since the potential level on lead (A-C)+(B-D) is still negative due to cell C still receiving more light than cell B, the motor SM1 starts to rotate the head about axis 22 in the direction of arrow 32. This rotation brings cell C farther over the line while cell A is exposed to light so that leads (A-C)+(B-D) moves to zero volts and stops rotation in the direction of arrow 32 to prevent the head from turning perpendicular to the line with the cells parallel thereto. It will be noted that amplifier 24 was not switched until the center of rotation 22 was sufficiently close to the line so as to prevent the head from being oriented perpendicular to the line with the cells parallel thereto. This allows the head to automatically find the line commonly known as line catching.

As the head continues to move across the line 20 under the influence of the X and Y motors, the center of rotation moves closer to the line. Any deviation from zero on lead (A-C)+(B-D) thereafter rotates the head and cell toward the darker cell, and since the head is centered over the line, brings the lighter cell to equal darkness. The relative speed of the X and Y motors for driving the head and cells along the line in the direction indicated by the arrow on axis 20 is continuously under control through the resolver R in the head.

With the output on lead A-C positive and the output on lead -(B-D) positive (the inverse of graph (B-D) ), lead (A-C)−(B-D) is a maximum positive value and the output of amplifier 24 holds the base circuits of transistors Q1, Q2, Q3 and Q4 biased in the off direction. The off pattern lamp L1 remains extinguished and the catch line switch SW2 remains open.

If the head had approached the line with cells D, C and B obscured in sequence, as shown at 20e' in FIG. 2, the falling output of cell B and rising output of cell D causes leads (B-D) and -(B-D) to both swing toward zero from a positive and negative value, respectively, while lead A-C holds positive. With lead -(B-D) going positive, lead (A-C)−(B-D) starts to move positive and, after it passes the threshold voltage T at amplifier 24, the amplifier turns Q1 and Q2 off. With Q1 off, the signal on lead (A-C)+(B-D) is effective to control motor SM1 to rotate the head about axis 22 to bring cell B additionally over the line; whereafter, the signal on lead (A-C)+(B-D) goes to zero when the cells B and C are centered over the line 20, as explained.

The X and Y motors are operated at a speed selected by the setting of ganged potentiometers P2 and P3 and at a ratio in accordance with the orientation of resolver R to provide a resultant for moving the head along axis 20 and in the direction of the arrow. If the cells B and C are displaced from axis 20, as for example by a line curve in the direction of cell D, cell B will be exposed to additional light. The output of cell B goes positive to cause a positive going signal on leads B-D and (A-C)+(B-D) to drive the steering motor SM1 in the corresponding direction for centering the head over the line. If cell C had been exposed to additional light due to a line curve, for example, leads (A-C) and (A-C)+(B-D) move in a negative direction to control motor SM1 for centering the head over the line.

If the head is displaced from the line at axis 20 in either direction, the graphs in FIG. 2 indicate the signal level changes, and in the event it moves far enough to lower the signal on lead (A-C)−(B-D) below the threshold voltage T at amplifier 24, the amplifier output swings positive. Transistor Q2, therefore, resumes conduction for lighting lamp L1. Simultaneously, the diode D4 becomes nonconductive allowing ground through resistor R18 to be extended to the gates of transistors Q3 and Q4, which now turn on. This grounds the junctions of R16 and R17, thus blocking the signals from the resolver R from being applied to amplifier 26 to prevent operation of the X and Y motors and bring the head movement to a halt. The source of the problem, such as poorly drawing line, is found and corrected and the control reactivated and moved to the line, as described.

If the head is to follow a left pattern edge, switch SW1 is operated to connect the top and center wipers W1 and W2 to leads -(A-C)+(B-D) and (A-C)+(B-D), respectively, at switch terminals 1 and 2. If the head is to follow a right edge, leads (A-C)−(B-D) and -(A-C)−(B-D) are connected to wipers W1 and W2 at terminals 3 and 4, respectively. As previously explained, left edge tracing occurs when the pattern overlaps the two cells C and D; and right edge tracing occurs when the pattern overlaps cells A and B. In left edge tracing, lead (A-C)+(B-D) controls amplifier 24 and lead -(A-C)+(B-D) controls motor SM1, while in right edge tracing lead -(A-C)−(B-D) controls amplifier 24 and lead (A-C)−(B-D) controls motor SM1. In either right or left edge tracing, ground is connected to one plate of capacitor C1 whose other plate is connected to the inverting input of amplifier 24, as the lower wiper W3 is now connected to ground at switch terminals 5 or 7.

The catch switch SW2 is operated to render transistors Q3 and Q4 nonconductive, while transistors Q1 and Q2 are conductive to hold the top wiper W1 at ground and lamp L1 is lighted, all as previously explained. The speed for the X and Y motors is selected and they are operated from the control panel, for example, to move the steering or tracing head carrying the cells A, B, C and D toward the pattern edge at an angle dependent on the rotational position of the head. The cells all sense the same level of light if moved over the background to provide a positive voltage of a respective level to the inputs of amplifiers 12, 14, 16 and 18, or they sense very little light if moved over the dark background. In either event, the amplifiers provide a zero output signal since the input signals are all of the same level.

In the event a left edge is to be traced, cell D, in moving toward the pattern edge, as shown by arrow 38 in FIG. 2a, first senses the edge indicated at 20m by moving from the background. The output of cell D decreases as it moves over the pattern and the output of amplifier 14 goes positive. A positive output from amplifier 14 appears on lead B-D to shift lead (A-C)+(B-D) in a positive direction as shown by the graphs marked (B-D) and (A-C)+(B-D) respectively in FIG. 2a. Lead -(A-C)+(B-D) normally shifts positive in synchronism with (B-D), as shown by the graph marked -(A-C)+(B-D); however, since the input to amplifier 22 is at ground, the signal on wiper W1 is blocked. The positive signal on lead (A-C)+(B-D) continues to increase as cell D advances over the pattern and would normally rise about the threshold voltage applied to amplifier 24. However, capacitor C1 and resistor R11 form an RC circuit to introduce a time delay in applying the signal on lead (A-C)+(B-D) to amplifier 24.

Cell C then moves over the pattern following cell D toward the edge seen at 20n. With cell C over the pattern, its output decreases and lead -(A-C) goes negative under the influence of cell A, while lead (A-C) goes positive. The positive output on lead (A-C) is added to the positive output on lead (B-D) to drive lead (A-C)+(B-D) in a still more positive direction. The potential on lead -(A-C) is the inverse of (A-C) and therefore the potential on lead -(A-C)+(B-D) starts to move in a negative direction.

As cell C passes position 20n, the capacitor C1 is charged in excess of the threshold voltage of amplifier 24, which now switches its output negative to turn off transistors Q1 and Q2 and hold transistors Q3 and Q4 off, as explained. Lamp L1 goes off and the operator need no longer hold switch SW2, while the signal on lead -(A-C)+(B-D) becomes effective to control motor SM1 for aligning the pattern edge between cells B and C, as shown at axis 20 in FIG. 2a, when the potential on lead -(A-C)+(B-D) goes to zero, as explained for lead (A-C)+(B-D) in line tracing; whereafter, the head follows the pattern edge in a manner explained.

In the event the head in left edge tracing approaches the edge from over the pattern, cell A will first be exposed to light, followed by cell B, as the cells move from over the pattern to over the background. The output of amplifiers 12 and 16 go negative and positive, respectively, under control of cell A to move lead (A-C)+(B-D) positive, and after cell B goes over the background, lead (B-D) goes positive to drive lead (A-C)+(B-D) additionally positive for switching the output of amplifier 24 negative, as soon as capacitor C1 charges above the threshold voltage T. The potential on lead -(A-C)+(B-D) is initially negative due to the signal on lead -(A-C), but starts to move toward zero as lead (B-D) goes positive, and with the output of amplifier 24 negative, the signal on lead -(A-C)+(B-D) becomes effective, as previously explained, to control motor SM1 for centering the edge between cells B and C and driving the head along the edge.

If a right edge is to be traced, the top and center wipers W1 and W2 are connected at terminals 3 and 4 to leads (A-C)−(B-D) and -(A-C)−(B-D), respectively. The bottom wiper W3 connects ground to capacitor C1 at position 7 to render the capacitor effective. In this case, cells A and B will normally be over the pattern and, therefore, in order to locate the edge between cells B and C, cell A moves in the direction of arrow 40 toward the pattern edge indicated at 20p in FIG. 2b. Lead -(A-C) goes positive, while lead (A-C), whose graph (A-C) is shown in FIG. 2b, goes negative when cell A starts to pass over the pattern edge to reduce its input to amplifier 12. Lead (A-C)−(B-D), therefore, also initially goes negative but is prevented from affecting amplifier 22 by transistor Q1 holding the amplifier input at ground. Lead -(A-C)−(B-D) goes positive in correspondence with the positive signal on lead -(A-C). The positive going displacement signal on lead -(A-C)−(B-D) cannot trigger amplifier 24 to provide a negative output, however, until capacitor C1 charges to at least the threshold voltage T.

Capacitor C1 charges to a level triggering amplifier 24 as cell B passes over the edge indicated at 20g to drive lead (B-D), whose graph is shown, negative. Lead -(B-D) which is the inverse of (B-D) goes positive to increase the displacement signal positive voltage on lead -(A-C)−(B-D) and move the steering signal potential on lead (A-C)−(B-D) toward zero.

The output of amplifier 24, therefore, goes negative and the steering signal on lead (A-C)−(B-D) is applied to amplifier 22 and motor SM1 for orienting the cells A and D across the edge shown at 20 and moving the head along the edge, as explained. Lamp L1 is, of course, extinguished and the switch SW2 released.

If in right edge tracing the head approaches the edge from over the pattern, cell D first senses the background after moving over edge 20p. The positive going output of cell D, therefore, controls amplifiers 14 and 18 to place negative and positive going outputs on leads (B-D) and -(B-D), respectively. The graph (B-D) would in this case be shifted to the right toward the line shown at 20p in FIG. 2b. The positive potential on lead -(B-D) in turn provides a positive voltage on lead -(A-C)−(B-D) and a positive going voltage on lead (A-C)−(B-D).

The positive voltage on lead -(A-C)−(B-D) thereafter increases as cell C moves over the background to provide a positive signal to lead -(A-C), and as soon as the signal on lead -(A-C)−(B-D) charges capacitor C1 above the threshold voltage T at amplifier 24, the output of amplifier 24 goes negative to cut off transistors Q1 and Q2. This enables the signal on lead (A-C)−(B-D) to be applied to amplifier 22 and motor SM1 for controlling the final steering of the cells across the edge and for enabling the motors X and Y to drive the head along the edge, as explained. Transistor Q2 on going off extinguishes lamp L1 and the switch SW2 opened, as explained.

The foregoing description of left and right edge tracing included a definition which is arbitrary, of course, and may be altered to cover different modes of operation.

It will be appreciated that the cells need not be rectangular or square or placed as shown in FIG. 1, but can be of a number of different configurations of equal area with one pair of cells placed intermediate the others or arranged along an axis transverse to the contour, as shown in FIGS. 3–3b. Thus, in FIG. 3, cells A and D are offset behind cells B and C in the scanning direction. In FIG. 3a the leading and rear edges of the cells describe an arc of larger and smaller radius, respectively, and in FIG. 3b the cells are arranged as right angle triangles with the hypotenuses of cells A and B in adjacent positions and the hypotenuses of cells C and D in adjacent positions transverse to the line or edge. The effect in each case is to provide rearward offset of the major area for cells A and D from cells B and C. The cells A-D in FIGS. 3–3b all provide signals of the same amplitude as each other cell to amplifiers 12 and 14 to provide the aforedescribed results.

The head, in approaching a change in line direction such as illustrated at broken lines 42 in each of FIGS. 3–3b, while moving in the direction of arrow 44, will cause cell A, for example, to just overlap the line while cells B and C have advanced further across the line in its new direction. Amplifier 16, therefore, reduces its positive output to lead (A-C). Lead (A-C)+(B-D), therefore, goes negative under the influence of lead (B-D) to steer the head closely in the direction of the line 42, since steering doesn't begin until cells B and C are well advanced over the new line 42; whereas, in the case where all four cells are in the colinear position shown in FIG. 1, the cells B and C are only partially advanced over the new line direction when the steering change occurs.

If the line curves in the opposite direction, steering is in the direction of cell D, of course. If a pattern edge is being traced, the same result is achieved, since the leading edges of the forward cells B or C are exposed to light, while one of the side cells A or D is still over the dark pattern.

The foregoing constitutes a description of improved contour tracing apparatus whose inventive concepts are not limited to the specific disclosed embodiments, but are believed set forth in the accompanying claims.

What is claimed is:

1. For use in a contour tracing system of the type including a rotatable tracing head having a resolver rotated with said head by a steering head motor to control the orientation of said head and resolver relative a longitudinally extending contour and enable said resolver to control the speed of a pair of coordinate drive motors for moving said head longitudinally along said contour, the improvement comprising a plurality of light sensitive cells of substantially equal area carried by said head, said cells arranged in adjacent juxtaposed positions with two of said cells intermediate the other of said cells, said two intermediate cells being offset from the other cells in the direction of head movement, means for combining the output of one of said intermediate cells with the output of a respective one of the other cells spaced adjacent the other intermediate cell and the output of said other intermediate cell with a respective other cell spaced adjacent one intermediate cell to provide a respective combined output signal for each intermediate cell and respective other cell, and means enabling said combined output signals to be combined for application to said steering head motor to control said steering head motor and coordinate drive motors for moving said head and cells longitudinally along said contour.

2. For use in a contour tracing system of the type including a rotatable tracing head having a resolver rotated with said head by a steering head motor to control the angular orientation of said head and resolver relative a contour describing either a line or a pattern edge and enable said resolver to control the relative speed of a pair of coordinate drive motors for moving said head to and along either said line or said pattern edge with said edge representing either a left edge or right edge contour, the improvement comprising a plurality of light sensitive cells of substantially equal area carried by said head, said cells arranged in adjacent positions with two of said cells intermediate the other of said cells, means for combining the output of one of said intermediate cells with the output of a respective one of the other cells spaced adjacent the other intermediate cell and the output of said other intermediate cell with a respective other cell spaced adjacent said one intermediate cell to provide a respective combined output signal for each intermediate cell and respective other cell, means for reversing the phase of each said combined output signal, means for combining the combined output signals to provide two groups of resultant signals with one group of resultant signals each individually corresponding to the spacing of said intermediate cells relative a line and a left and right pattern edge and other group of said resultant signals each individually corresponding to the angular orientation of said cells relative said line and a left and right pattern edge, means operable for selecting one spacing signal of said one group of resultant signals and a respective one angular orientation signal of said other group of resultant signals, and means operable in response to said selected one spacing signal reaching a predetermined value for enabling application of the selected angular orientation signal to said steering head motor for controlling the angular orientation of said cells and head relative the corresponding pattern edge or line and said coordinate drive motors to move said head to and along said corresponding edge or line.

3. The improvement claimed in claim 2, in which said enabling means comprises a last differential amplifier, means for applying said selected spacing signal to the inverting input of said last amplifier, and means for controlling said last amplifier inverting input to render said selected spacing signal ineffective until said spacing signal reaches said predetermined value.

4. In the improvement claimed in claim 3, a capacitor effectively connected to said last amplifier inverting input in the event said contour defines a pattern edge to delay the application of a respective spacing signal to said last amplifier.

5. In the improvement claimed in claim 3, a normally conductive transistor for rendering each angular orientation signal ineffective to control said steering head motor, and means controlled by said last amplifier in response to a respective spacing signal reaching said predetermined value for rendering said transistor non-conductive to enable the application of the respective orientation signal to said steering head motor.

6. In the improvement claimed in claim 3, a pair of normally conductive transistors for preventing the application of respective signals from said resolver to said coordinate drive motors, and means controlled by said last amplifier in response to a spacing signal reaching said predetermined value for preventing conduction by either of said pair of transistors.

* * * * *